United States Patent [19]

Kuzara

[11] Patent Number: 4,532,892
[45] Date of Patent: Aug. 6, 1985

[54] ANIMAL FEEDING AND MONITORING SYSTEM

[75] Inventor: James H. Kuzara, Sheridan, Wyo.

[73] Assignee: Ralston Purina Company, St. Louis, Mo.

[21] Appl. No.: 606,132

[22] Filed: May 2, 1984

Related U.S. Application Data

[62] Division of Ser. No. 293,314, Aug. 17, 1981.

[51] Int. Cl.³ ............................................. A01K 5/02
[52] U.S. Cl. ................................................... 119/51 R
[58] Field of Search ............... 119/51 R, 14.08, 14.14; 340/825.54, 825.72; 343/6.8 R, 6.8 LC

[56] References Cited

U.S. PATENT DOCUMENTS

| | | | |
|---|---|---|---|
| 4,114,151 | 9/1978 | Denne et al. | 343/6.8 R |
| 4,196,418 | 4/1980 | Kip et al. | 340/825.54 |
| 4,461,241 | 7/1984 | Ostler | 119/51 R |

*Primary Examiner*—Jay N. Eskovitz
*Attorney, Agent, or Firm*—Price, Heneveld, Huizenga & Cooper

[57] ABSTRACT

The animal feeding and monitoring system includes an electronic identity tag having a code generator for generating a coded identifier signal uniquely associated with an animal to be identified. Electromagnetic energy from an RF field generator mounted in a feeding station is coupled into a pick-up coil in the electronic identity tag when the animal wearing the electronic identity tag approaches the feeding station. Electromagnetic energy coupled into the pick-up coil serves a source of power for the operating components of the tag. The code generator generates the coded identifier signal in response to timing pulses supplied by either an independently set RC oscillator circuit or a countdown circuit connected to the pick-up coil. A voltage detector connected to the pick-up coil is connected to gate the coded identifier signal transmissions only when sufficient power to provide error-free operation of the code generator has accumulated in the pick-up coil.

Once the animal has been identified, certain control and monitoring functions can be performed under the command of a central computer. The central computer can direct the delivery of feed to the identified animal in accordance with that animal's feeding requirements. Where the animal to be identified is a cow, feed consumption, milk production and temperature measurements for a particular cow can be obtained and stored over a period of time, enabling the central computer to determine the feeding requirements for that cow. Additional monitoring and diagnostic routines can be performed by the central computer to ascertain whether the cow is in heat or has mastitis. A multiplexing arrangement permits these various control, monitoring and diagnostic routines to be performed for a plurality of animals located in adjacent feeding stations.

2 Claims, 12 Drawing Figures

ANIMAL FEEDING AND MONITORING SYSTEM

This application is a division of application Ser. No. 293,314, filed Aug. 17, 1981.

TECHNICAL FIELD

The present invention relates to a system for feeding and monitoring individual animals in a herd of animals, and more specifically relates to a system which electronically identifies individual animals by means of a coded identifier signal transmitted from an electronic identity tag worn by the animal and which thereafter dispenses measured quantities of feed to the identified animal while performing related animal monitoring and diagnosing functions.

BACKGROUND ART

Systems heretofore developed for electronically identifying separate animate or inanimate objects in a group of objects, particularly those systems designed to distinguish between animals in a herd for the purpose of controlling the feed dispensed to the animals, can generally be divided into one of two classes. Systems in the first class carry out the identification process on a gross level only, tagging certain objects with an electronic distinguishing marker and then simply sorting all of the objects according to whether they have or have not been tagged. For example, where certain animals in a herd are selected to receive feed supplements, an electronic distinguishing marker which activates a switching circuit connected to control delivery of the feed supplement to a feeding station is attached to the selected animal. Such electronic distinguishing markers may take many forms, including devices which disturb the magnetic field surrounding a magnetic switching circuit, as disclosed in U.S. Pat. No. 4,162,683 issued to Brooks and U.S. Pat. No. 4,188,912 issued to Smalley; and devices which damp, absorb or otherwise disturb the RF field generated by a RF switching circuit, as disclosed in U.S. Pat. No. 3,465,724 issued to Broadbent, U.S. Pat. No. 3,541,995 issued to Fathauer and U.S. Pat. No. 3,557,757 issued to Brooks.

Systems in the second class provide a means for identifying animate or inanimate objects in a true sense. That is, each animate or inanimate object in a group of objects is tagged with an electronic marker having a characteristic uniquely associated with that object. The electronic marker or identity tag is subsequently "read" via suitable electronic circuitry to obtain the object identity, and the object identity so obtained is used to initiate various control or monitoring sequences. One important application for systems of the second class involves the identification of animals and the dispensing of feed on the basis of the identified animal's individual feed requirements.

Some prior art animal feeding systems employ identity tags having passive RF circuits similar to the RF circuits of the aforementioned Broadbent and Brooks patent, wherein RF energy is absorbed by a detector at several predetermined frequencies uniquely arranged to provide a means for identifying the animals. U.S. Pat. No. 3,516,575 issued to Moffitt and U.S. Pat. No. 3,557,758 issued to Lack disclose passive RF energy absorbing type identity tags. Other prior art animal feeding systems employ identity tags having active RF circuits which radiate RF energy at discrete frequencies to provide a means for identifying the animals. These discrete frequencies are received by a plurality of receiving circuits mounted at or near the animal feeding station. The latter type of active RF identity tag system is disclosed in U.S. Pat. No. 3,180,321 issued to Aldinger.

Frequency-dependent animal identification processes such as those illustrated in the Broadbent, Moffitt and Lack patents are entirely adequate for many applications. Where digital control means are utilized to control the feed delivery operation, however, frequency-dependent systems must be properly interfaced with the digital controller before the identification process can be completed. This interface generally requires an extra analog to digital conversion step in the frequency-dependent signal receiving apparatus, with an attendant increase in circuit complexity and cost. It would be of obvious advantage if the identifier signal radiated from the identity tag were already in digital form.

Perhaps the simplest manner of digital identification involves a simple count. An animal is assigned an identification number, an identity tag having a counter programmed to supply the predetermined number or count is attached to the animal, and whenever a receiver in the vicinity of the animal detects the predetermined count, the animal is identified. U.S. Pat. No. 3,929,277 issued to Byrne et al and U.S. Pat. No. 4,129,855 issued to Rodrian both disclose counting-type identity tags. In the Byrne et al system, a series of RF pulses corresponding in number to a predetermined count are generated by an identity tag counter and transmitted to a receiver for counting. In the Rodrian system, the identity tag counter counts to a predetermined value and then merely transmits a reset pulse to stop the count in a synchronized counter connected to the system transceiver.

Although animal identification signals developed by counting-type identity tags are more conveniently interfaced with digital control means than those developed by frequency-dependent identity tags, if the number of animals to be identified is quite large, it becomes somewhat cumbersome to actually count RF identification pulses. It would thus be even more advantageous to generate an animal identifier signal in compact, coded form for transmission to a digital receiver/decoder. Standard integrated circuit technology could be employed to construct suitable code generators and receiver/decoders at low cost and with reduced size. Further economies of cost and size could be realized by eliminating the need for a separate identity tag power supply in favor of a simple energy absorbing circuit in the identity tag, into which RF energy could be coupled to provide a ready source of power. The ease and convenience of transmitting binary coded identifier signals from an electronic identity tag would render the tag fully compatible with most digital computer configurations, in turn increasing the range of control, monitoring and diagnostic functions available to an animal feeding and monitoring system.

DISCLOSURE OF THE INVENTION

It is therefore an object of the present invention to provide a system for feeding and monitoring animals.

It is another object of the present invention to provide an animal feeding and monitoring system wherein the animal to be identified wears an electronic identity tag capable of generating and transmitting a coded identifier signal.

It is still another object of the present invention to provide an electronic identity tag having a code generator for generating coded identifier signals uniquely associated with the animal wearing the tag, which code generator is powered by electromagnetic energy coupled into the electronic identity tag from a remote electromagnetic energy source, thereby obviating the need for an internal tag power supply.

It is a further object of the present invention to provide an electronic identity tag having a pick-up coil for receiving electromagnetic energy from a remote source and a code generator powered by the electromagnetic energy so received to generate a coded identifier signal at a frequency independent of the frequency of the received electromagnetic energy.

It is yet another object of the present invention to provide an electronic identity tag having a pick-up coil for receiving electromagnetic energy from a remote source and a code generator powered by the electromagnetic energy so received to generate a coded identifier signal at a frequency proportional to the frequency of the received electromagnetic energy.

It is an additional object of the present invention to provide an animal feeding and monitoring system employing an RF field generator for coupling RF operating power into an electronic identity tag worn by an animal to be identified.

It is an additional object of the present invention to provide an animal feeding and monitoring system wherein the RF field generator employed to couple operating power into an electronic identity tag worn by an animal to be identified is capable of selectively increasing the coupling range of the RF field so generated in order to compensate for variations in distance between the RF field generator and the electronic identity tag.

It is also an object of the present invention to provide an animal feeding and monitoring system capable of identifying and feeding a plurality of animals in adjacent feeding stations.

It is another object of the present invention to provide a method for monitoring the milk production of an identified cow in order to construct a lactation curve for the identified cow, thereby establishing a basis for determining the feed requirements of the identified cow.

It is a further object of the present invention to provide a method for monitoring the temperature, feed consumption and milk production of an identified cow in order to ascertain whether the identified cow is in heat.

It is a still further object of the present invention to provide a method for monitoring the temperature, feed consumption and milk production of an identified cow in order to diagnose the occurrence of mastitis in the identified cow.

An additional object of the present invention is to provide a system and method for monitoring pounds of milk production and percent of butterfat in the milk produced by an identifiable cow as well as udder temperature and the udder somatic cell count.

These and other objects of the present invention are accomplished with an animal feeding and monitoring system in which an animal to be identified wears an electronic identity tag having a code generator for generating a coded identifier signal uniquely associated with the animal to be identified. Electromagnetic energy from an RF field generator mounted in a feeding station is coupled into a pick-up coil in the electronic identity tag when the animal wearing the electronic identity tag approaches the feeding station. Electromagnetic energy coupled into the pick-up coil serves as a source of power for the operating components of the tag. The code generator generates the coded identifier signal in response to timing pulses supplied by either an independently set RC oscillator circuit or a countdown circuit connected to the pick-up coil. Where the RC oscillator circuit is used, the frequency of the coded identifier signal generated by the code generator is independent of the frequency of electromagnetic energy coupled into the pick-up coil. Where the countdown circuit is used, the coded identifier signal frequency is proportional to the frequency of the received or coupled electromagnetic energy. A voltage detector connected to the pick-up coil is connected to gate the coded identifier signal transmissions only when sufficient power to provide error-free operation of the code generator has accumulated in the pick-up coil.

Because the coded identifier signals transmitted from the electronic identity tag can vary somewhat in frequency, particularly if the RC oscillator is used to supply timing pulses to the code generator, the animal feeding and monitoring system of the present invention incorporates a receiver with a frequency lock feature. Other modifications to the system include the provision of an RF field generator which can be stepped through progressively more powerful field generating modes. Thus, the coupling range of the RF field generator can be incrementally increased to precisely compensate for variations in distance between the electronic identity tag and the RF field generator, which variations result from unpredictable movement of the animal wearing the electronic identity tag.

Once the animal has been identified, certain control and monitoring functions can be performed under the command of a central computer. For instance, the central computer can direct the delivery of feed to the identified animal in accordance with that animal's feeding requirements. Where the animal to be identified is a cow, feed consumption, milk production and temperature measurements for a particular cow can be obtained and stored over a period of time, enabling the central computer to determine the feeding requirements for that cow. Additional monitoring and diagnostic routines can be performed by the central computer to ascertain whether the cow is in heat or has mastitis. In one embodiment of the present invention, a multiplexing arrangement permits these various control, monitoring and diagnostic routines to be performed for a plurality of animals located in adjacent feeding stations.

BRIEF DESCRIPTION OF THE DRAWINGS

The features, objects and advantages of the present invention will become more apparent from the following Brief Description of the Drawings and Best Mode for Carrying Out the Invention, wherein.

BEST MODE FOR CARRYING OUT THE INVENTION

Figure 1:
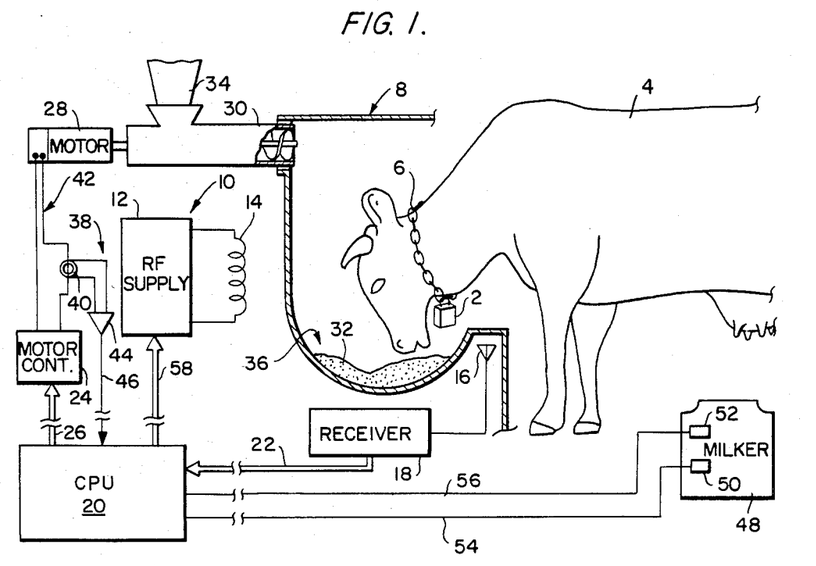
FIG. 1 is a schematic representation of the animal feeding and monitoring system of the present invention.

The animal feeding and monitoring system of the present invention is shown schematically in FIG. 1. The system provides a means for identifying individual animals in a group or herd or animals, whereupon various data collected in connection with an identified animal can be tagged and stored for subsequent processing. System operation is initiated by an electronic identity tag 2, carried on the animal to be identified and monitored. For the sake of convenience, a cow 4 is illustrated in FIG. 1, but it is to be understood that the system can be employed with other types of animals, both domestic and wild. Electronic identity tag 2 is secured to the cow by a suitable means such as a chain 6. When the cow approaches feeding station 8, RF energy from an RF field generator 10 is electromagnetically coupled into the electronic identity tag. RF generator 10 includes an RF supply 12 and an RF coil 14 for establishing an RF field in the vicinity of feeding station 8. Electronic identity tag 2 thereafter functions as described in detail hereinbelow to transmit the coded identifier signal uniquely associated with cow 4. This coded identifier signal is picked up by a receiving antenna 16 and processed in a receiver 18 which communicates the cow's identity to a central computer 20 via data link 22. Central computer 20 can perform a number of control and measuring routines. For example, upon receipt of the cow's identity, central computer 20 can instruct a motor controller 24 via data link 26 to activate motor 28 for a precise interval computed in accordance with the feeding requirements of the identified cow. Motor 28 in turn drives feed delivery mechanism 30 to deliver a carefully measured quantity of feed 32 from feed hopper 34 to the feed trough 36 of feeding station 8. A faulty feed delivery indicator 38 may be connected to central computer 20 to signal the occurrence of a fault condition in either motor 28 or feed delivery mechanism 30. The faulty feed delivery indicator includes a current sensing coil 40 mounted to detect the level of current passing from motor controller 24 through current input lines 42 to motor 28. The output from current sensing coil 40 is amplified by current amplifier 44 and supplied to remote computer 20 on lead 46. When the value of the current level detected by current sensing coil 40 is compared against the normal load current value stored in computer 20, a determination of the feed delivery situation can be made. If the detected current level exceeds the normal current level by a predetermined amount, motor overload is indicated, while detected current levels more than a predetermined amount below the normal current levels indicate that motor 28 is underloaded due to emptying of hopper 34. In either case, central controller 20 can activate an alarm (not shown) to alert the feeding station operator to the detected condition.

Where feeding station 8 or a separate milking station, includes a milking apparatus 48, a measure of the yield or quantity of milk obtained from the identified cow during milking, as well as the temperature and somatic cell count of the milk so obtained, can be ascertained by appropriate sensors 50,52 and supplied along leads 54,56 to central computer 20 for use in one of several diagnostic procedures described in greater detail hereinbelow. Milk quantity may be indicated by a liquid level sensor, weight sensor or other known sensors adapted to indicate the quantity of fluid in a container.

Finally, a data link 58 between central computer 20 and RF field generator 10 enables the central computer to govern the energy input level to the RF field generator. Hence, the strength of the RF field generator output may be adjusted to carry out the electronic identity tag locating procedure further disclosed in connection with FIGS. 5 and 6.

Figure 2:
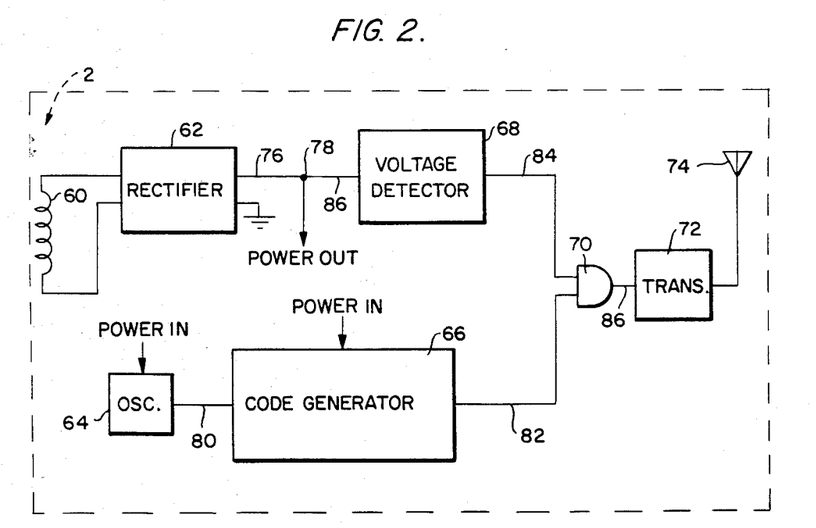
FIG. 2 is a block diagram of an electronic identity tag for use in the system of the present invention, the electronic identity tag having a code generator supplied with timing pulses by an RC oscillator circuit.

FIG. 2 is a block diagram of one embodiment of an electronic identity tag 2 constructed in accordance with the present invention. The electronic identity tag of FIG. 2 includes a pick-up coil 60, a rectifier 62, and RC oscillator circuit 64, a code generator 66, a voltage detector 68, an AND gate 70, a transmitter chip 72 and a transmitting antenna 74. The pick-up coil 60 functions in a manner analgous to a transformer secondary to receive RF energy from the RF coil 14 of RF generator 10. The RF energy received or coupled into pick-up coil 60 is rectifier in rectifier 62 and conducted along lead 76 to a power tap 78. Power tap 78 serves as a source of power for the remainder of the electronic identity tag.

RC oscillator circuit 64 draws power from power tap 78 to produce a series of timing pulses having a period dependent on the time constant of the RC or crystal oscillator circuit. Each timing pulse is input along lead 80 to code generator 66, which thereafter generates the aforementioned coded identifier signal uniquely associated with cow 4. Code generator 66 may comprise a programmable encoder of the type manufactured by Supertex, Inc. of Sunnyvale, Calif., under the designation ED-9 or ED-15. The ED-9 encoder has a capacity of five hundred and twelve different binary coded addresses and thus an electronic identity tag employing the ED-9 encoder can be programmed to output any one of five hundred and twelve coded identifier signals.

The coded identifier signals from code generator 66 are fed along lead 82 to AND gate 70. The purpose of AND gate 70 is to reduce the error rate in transmissions of the coded identifier signals from the electronic identity tag 2 to the receiving antenna 16 of feeding station 8. As cow 4 initially approaches the feeding station, pick-up coil 60 begins to receive RF energy from the RF generator 10. This RF energy, however, is generally of a level insufficient to power the RC oscillator circuit 64 and the code generator 66 until the cow moves to within a certain distance of the RF coil 14. Insufficient RC oscillator circuit and code generator power, of course, produces errors in the coded identifier signal output from the code generator. To prevent such erroneous coded identifier signals and the consequent misidentification of the cow wearing the electronic identity tag, the remaining lead 84 of AND gate 70 is connected to voltage detector 68. The input lead 86 to voltage detector 68 is in turn connected to the power tap 78. A gate enabling signal is supplied to the AND gate 70 from voltage detector 68 along lead 84 only when the voltage at the power tap 78 exceeds a predetermined threshold voltage of the voltage detector, which predetermined threshold voltage is set to a level above that necessary to supply minimum operating power to the RC oscillator circuit 64 and the code generator 66. With the AND gate enabled, the coded identifier signals can then pass along lead 86 to transmitter chip 72 and transmitting antenna 74 for error-free transmission to receiving antenna 16 in the feeding station 8.

Figure 3:
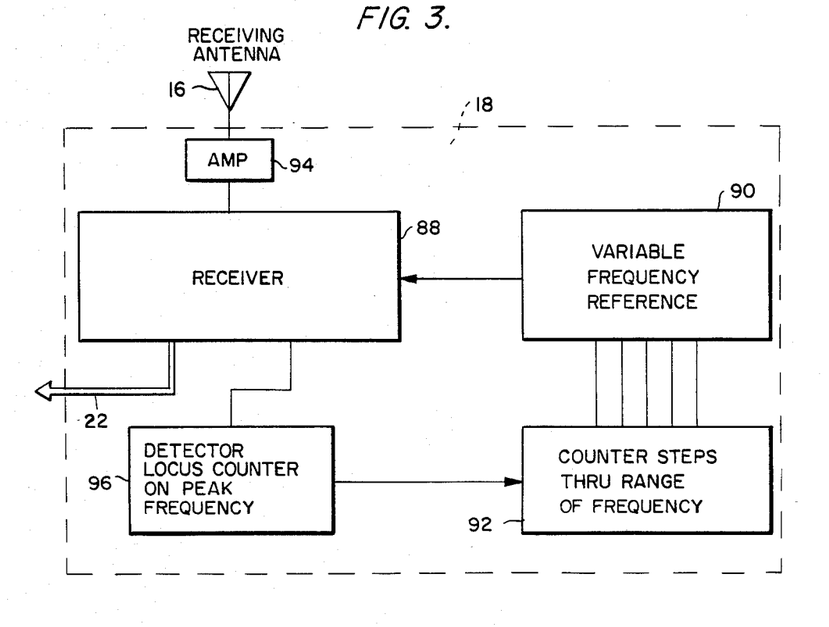
FIG. 3 is a block diagram of a receiver circuit particularly suited for use with the electronic identity tag of FIG. 2.

The transmission frequency of the coded identifier signals from the electronic identity tag 2 of FIG. 2 is a function of the frequency of the timing pulses supplied to code generator 66 by RC oscillator circuit 64. The frequency of the timing pulses, as previously mentioned, depends upon the RC time constant of the RC oscillator circuit. Due to minor manufacturing variations, changes in ambient temperature, or the like, this time constant may vary somewhat between the individual electronic identity tags uniquely associated with each cow. In order to insure proper detection of the coded identifier signals regardless of variation in transmitting frequency, the receiving antenna 16 and receiver circuit 18 of FIG. 1 must be capable of scanning a relatively wide frequency band and locking onto the particular discrete frequency at which any given set of coded identifier signals are being transmitted. Such a receiving antenna and receiver circuit arrangement is illustrated in FIG. 3. Receiver circuit 18 of FIG. 3 includes a receiver chip 88 which is supplied with a reference frequency by a variable frequency source 90. Variable frequency source 90 may comprise a voltage controlled oscillator or similar type of device having a frequency output which varies in response to changing inputs. A counter circuit 92 is connected to input an ordered sequence of control pulses to the variable frequency source 90, thereby stepping the reference frequency from the variable frequency source at predetermined intervals through the range of available frequencies. When the coded identifier signals arrive at receiving antenna 16, they are amplified in an amplifier 94 and fed to receiver chip 88. Counter circuit 92 is activated to begin the frequency stepping or scanning process, and when the reference frequency supplied by variable frequency source 90 matches the transmission frequency of the coded identifier signal, a detector 96 senses the match and locks the counter unit 92 onto the particular control pulse producing the matching reference frequency. Subsequently, the coded identifer signals can be detected in receiver chip 88 and directed to central computer 20 over data link 22.

Figure 4:
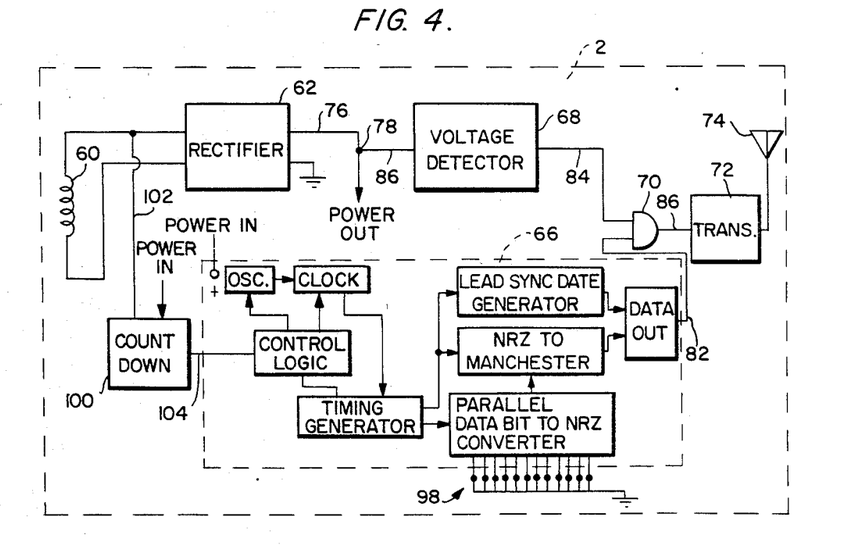
FIG. 4 illustrates a modified electronic identity tag having a countdown circuit for supplying timing pulses to the code generator.

If desired, the electronic identity tag 2 of FIG. 2 can be modified as indicated in FIG. 4 to eliminate the need for a scanning receiver circuit of the type illustrated in FIG. 3. The overall functioning of the FIG. 4 electronic identity tag is similar in most respects to that of the FIG. 2 tag, with tag components in FIG. 4 having the same reference numerals as like components in FIG. 2. Thus, pick-up coil 60 receives energy from RF field generator 10, and recitifier 62 recitifies the received RF energy to provide power tap 78 with tag operating power. Code generator 66 generates a coded identifier signal which uniquely identifies the cow carrying or wearing the electronic identity tag 2. In the interest of completeness, the internal elements of the Supertex, Inc. ED-9 programmable encoder empolyed as the code generator in FIG. 2 have been schematically blocked out in FIG. 4. Appropriate cuts in the data bit inputs 98 to the ED-9 encoder are used to set the desired binary Manchester-encoded address forming the coded identifier signal for a particular cow. Voltage detector 68 and AND gate 70 operate in the manner previously disclosed to insure that no transmission of the coded identifier signal from transmitter chip 72 and transmitting antenna 74 occur until the power supplied at power tap 78 is sufficient to enable error-free operation of the code generator 66. In contrast to the FIG. 2 embodiment, however, code generator 66 in the FIG. 4 embodiment is driven by a countdown circuit 100 which produces a timing pulse proportional to the frequency of the RF energy generated by RF field generator 10. Countdown circuit 100 is connected to detect the frequency of the incoming RF energy in pick-up coil 60 via lead 102. Internal logic frequency divider circuitry of a conventional type in the countdown circuit divides the RF field frequency by a predetermined amount to provide a series of timing pulses of proportional frequency on lead 104. The timing pulses are input to code generator 66, and the coded identifier signals are subsequently generated and transmitted at a single discrete frequency dependent on the frequency of the timing pulses. Armed with knowledge of the internal logic of the countdown circuit 100, the system operator can accurately calculate this single discrete transmission frequency of the coded identifier signals. Thus, a conventional receiver circuit tuned to the transmission frequency as calculated can be employed at feeding station 8 in lieu of the FIG. 3 receiver circuit to receive and detect the coded identifier signals.

Figure 5:
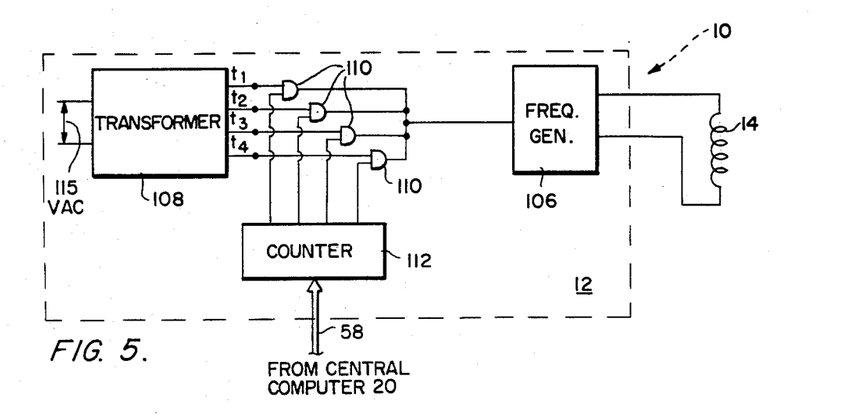
FIG. 5 illustrates a RF field generator capable of generating progressively more powerful RF fields under the control of the system central computer.

A problem in the use of electronic identity tag 2 with a particular cow may be encountered where the cow enters feeding or milking station 8 but does not move close enough to the RF field generator 10 to couple energy into the pick-up coil of the electronic identity tag at a level sufficient to exceed the threshold level of voltage detector 68 and enable AND gate 72 for transmission of the coded identifier signals. As may be surmised, this problem arises because the cow is not restricted to a single, well defined position in the feeding or milking station. On the contrary, the cow can occupy any one of several locations within the feeding station, each such location placing the electronic identity tag 2 worn by the cow at a different distance from RF field generator 10. RF supply 12 can nonetheless be constructed as shown in FIG. 5 to overcome the disadvantages associated with the unpredictable movement of the cow and the associated electronic identity tag. A frequency generator 106 connected to RF coil 14 serves as the basic source of RF energy for the RF field generator. Although the RF output from frequency generator 106 exhibits a characteristic fixed frequency established by the electrical values of the frequency generator components, the amplitude of the frequency generator RF output, and hence, the power content of the RF energy radiating from RF coil 14, can be varied depending upon the level of voltage input to the frequency generator. Accordingly, a transformer 108 having a series of voltage taps $t_1, t_2 \ldots t_x$ for respectively supplying progressively increasing voltage levels is connected to the frequency generator. A series of AND gates 110 connected between the voltage taps $t_1$–$t_x$ and the frequency generator selectively apply the transformer voltage levels to the frequency generator in response to a set of enabling signals from counter 112. The set of enabling signals are generated in an ordered sequence such that AND gate 110 connected to voltage tap $t_1$ is first enabled, followed by AND gate 110 connected to voltage tap $t_2$, AND gate 110 connected to voltage tap $t_3$ and so on until the AND gate 110 connected to voltage tap $t_x$ is finally enabled. None of the enabling signals from counter 112 overlap, and thus only one AND gate at a time may be closed. It can now be seen that the successive action of the AND gates, in combination with the progressively increasing voltages on taps $t_1$–$t_x$, input progressively increasing voltages to frequency generator 106. As a result, the frequency generator outputs RF energy in progressively increasing output levels, and the coupling range of RF coil 14 is progressively expanded with respect to electronic identity tag 2.

Figure 6A:
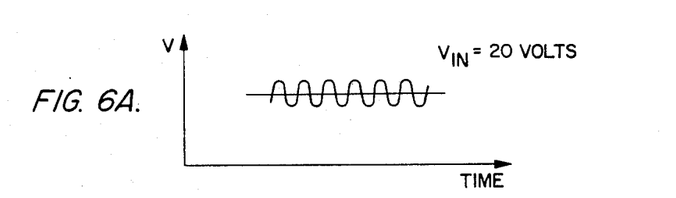
FIGS. 6A–6D schematically represent the operation of the FIG. 5 RF field generator.
Figure 6B:
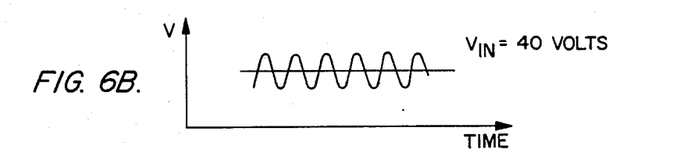
Figure 6C:
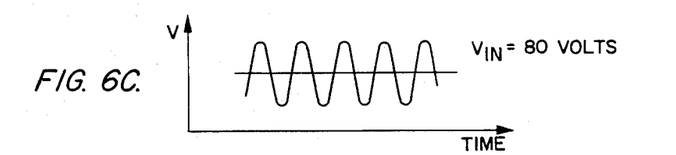
Figure 6D:
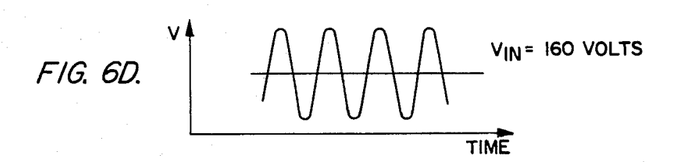

FIGS. 6A through 6D illustrate the operation of field generator 10 in graphic form. Using an exemplary four tap transformer 108 with 20 volt, 40 volt, 80 volt and 160 volt potentials supplied on voltage taps $t_1$, $t_2$, $t_3$ and $t_x$, the enabling of AND gate 110 connected to voltage tap $t_1$ produces the relative frequency generator RF output indicated in FIG. 6A. The enabling of AND gate 110 connected to voltage tap $t_2$ produces the relative frequency generator RF output indicated in FIG. 6B. FIG. 6C depicts the relative frequency generator RF output produced when AND gate 110 connected to voltage tap $t_3$ is enabled, while FIG. 6D depicts the relative frequency generator RF output produced when AND gate 110 connected to voltage tap $t_4$ is enabled. With an RF field generator such as that disclosed in FIG. 5 compensation for variation in distance between a cow with its associated electronic identity tag 2 and RF coil 14 is a simple matter. At the beginning of the cow identification process, computer 20 instructs counter 112 via data link 58 to initiate the enabling signal sequence. The input voltage level to frequency generator 106 is subsequently increased to step the frequency generator RF output through ever greater amplitudes until a coded identifier signal is at last received from electronic identity tag 2. At this point the enabling sequence is interrupted to lock the currently-enabled AND gate 110 into closed condition for a period of time sufficient to permit verification of the coded identifier signal in central computer 20. At the completion of coded identifier signal verification, central computer 20 can shut counter 112 down until the next cow to be identified has entered the feeding station 8. If no coded identifier signal is received at receiving antenna 16 after the highest available voltage from transformer 108 has been applied to frequency generator 106, of course, central computer 20 recognizes a "no cow present" status for the feeding station.

Figure 7:
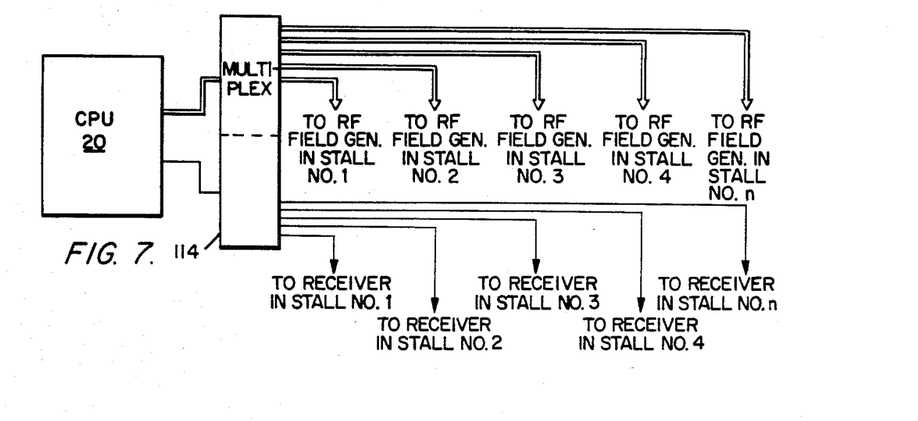
FIG. 7 illustrates a multiplexing arrangement for use when a plurality of animals in adjacent feeding stations are to be identified.

It is common practice on a dairy farm to employ a number of adjacent stalls or "milking parlors" wherein a plurality of cows can be fed and/or milked simultaneously. The animal feeding and measuring system of the present invention can be adapted to such an arrangement. Each stall is equipped with a feeding station 8, and the motor controller data link 26, faulty feed delivery indicator lead 46, milk yield sensor lead 54 and milk temperature, percent butterfat and somatic cell sensor lead 56 from each feeding station are connected directly to central computer 20. In order to prevent the RF fields produced by RF field generators in adjacent stalls from interfering with one another, however, it is necessary to time multiplex the operation of the RF field generators 10 and receiver circuits 18 at the individual feeding stations. To this end, a multiplexer 114, shown in FIG. 7, is connected across data links 22 and 58 respectively providing communication between the central computer 20, the receiver circuit and the RF field generator. Multiplexer 114 functions to insure that control signals directed from central computer 20 to the counters 112 in the RF field generators of adjacent feeding stations reach only one counter at a time, thereby "activating" only one feeding station at a time. Likewise, only those coded identifier signals detected in the receiving circuit 18 associated with the "activated" feeding station can pass through multiplexer 114 to central computer 20. Upon further reflection, it is evident that the action of multiplexer 114 in sequencing the operation of the RF field generators 10, together with the action of the FIG. 5 RF supply 10 in providing controlled expansion of the RF field generator coupling range, tends to minimize the possibility that the receiving circuit 18 in an "activated" feeding station will mistakenly detect the coded identifier signal from the electronic identity tag worn by a cow in an adjacent feeding station.

Figure 8:
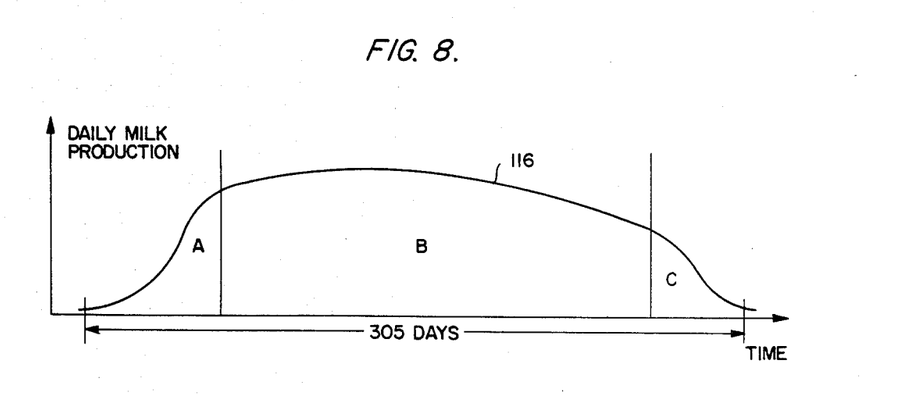
FIG. 8 graphically depicts a lactation curve for a hypothetical cow.

Once a particular cow has been identified by detecting and verifying the unique coded identifier signal associated with that cow, central computer 20 can perform numerous control and diagnostic determinations pertinent to the identified cow. For example, the aforementioned delivery of a carefully measured quantity of feed, based on the feeding requirements of the identified cow, can be automatically carried out in the central computer by ascertaining the identified cow's position in her lactation cycle. FIG. 8 illustrates a typical lactation curve 116 for a hypothetical cow. During periods of increasing milk production, indicated by region A in FIG. 8, a cow generally requires a high feed to milk production ratio $R_i$, say one pound of feed for each pound of milk produced. During peak periods of milk yield or production in the lactation cycle, indicated by region B in FIG. 8, the cow's feed requirements level off somewhat, giving a feed to milk ratio $R_p$ of, say, one pound of feed for each two pounds of milk produced. During the decreasing period of milk production in the cow's lactation cycle indicated by region C in FIG. 8, the cow's feed requirements taper off significantly, giving a feed to milk ratio $R_d$ of, say, one pound of feed for each four pounds of milk produced. An identified cow's position in her lactation cycle can be approximated by means of some simple calculations. Where current milk production $P_c$ exceeds the previous day's milk production $P_p$ by a predetermined amount, i.e.,:

$$P_c - P_p > A,$$

the cow is in a increasing period of milk production. Where current milk production differs from the previous day's milk production by less than a predetermined amount, i.e.:

$$P_c - P_p > B,$$

the cow is in her peak period of milk production. Finally, where current milk production is less than the previous day's milk production by a predetermined amount, i.e.:

$P_c - P_p < -C$, the cow is in her decreasing period of milk production. Having thus computed the cow's position on the lactation curve, the cow's feed requirements can be determined by a second series of simple computations. Where the cow is in her increasing milk production period, the feed ratio for the increasing production period $R_i$ is multiplied by current milk production $P_c$ to obtain the quantity of feed which must be metered out by central computer 20:

$$\text{Amount of Feed} = R_i \times P_c$$

Where the cow is in her peak period of milk production, the feed ratio for the peak period $R_p$ is multiplied by current milk production $P_c$ to obtain the necessary quantity of feed:

$$\text{Amount of Feed} = R_p \times P_c$$

Where the cow is in her decreasing period of milk production, the amount of feed required is obtained by multiplying the ratio for the decreasing period $R_d$ by the current milk production:

$$\text{Amount of Feed} = R_d \times P_c$$

After completion of the relevant calculations, of course, central computer 20 directs motor controller 24 to activate motor 26 and deliver the proper amount of feed, as previously disclosed.

Figure 9:
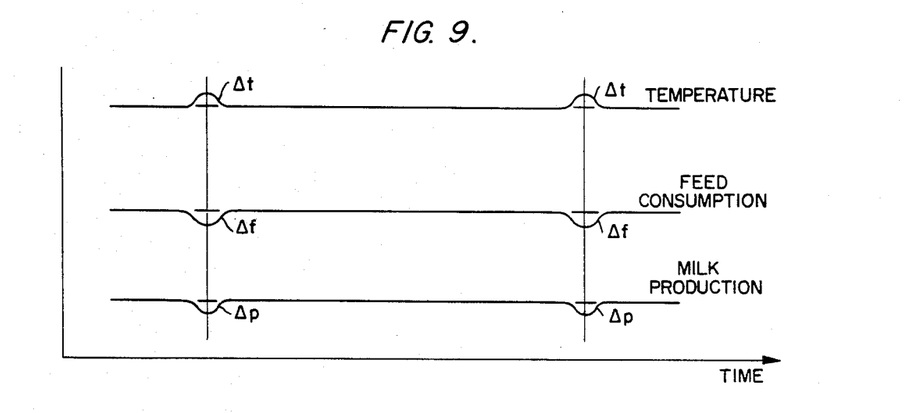
FIG. 9 graphically depicts the changes in temperature, feed consumption and milk production which indicate that a particular cow is in heat.

Central computer 20 can also be programmed to alert the system operator to the fact that an identified cow is in heat. The ability to detect, when a cow is in heat is important, inasmuch as the cow should be bred as soon as possible after it enters heat. Generally speaking, the temperature of a cow in heat rises somewhat while the cow's feed consumption and milk production drop off. This relationship is graphically illustrated in FIG. 9. If the temperature, feed consumption and milk production variables for a cow identified in accordance with the present invention are monitored over a period of time, then central computer 20 can accurately track the relationship between these three variables and provide some sort of output signal when the variable relationship indicates that the identified cow is in heat. The cow's temperature is reflected in the temperature of the milk produced by the cow and thus can be measured by sensor 52 in feeding station 8. Similarly, the cow's milk yield or production is measured as disclosed above by sensor 50 in the feeding station. In order to determine feed consumption, a weighing device (not shown) or the like can be mounted under the feeding station trough to gauge the amount of feed actually consumed by the cow following delivery of the feed from feed hopper 34. The changes in temperature, feed consumption and milk production from day to day, respectively designated T F and M are determined and compared against the average temperature, feed consumption and milk production, respectively designated $T_{avg}$, $F_{avg}$ and $M_{avg}$, by means of a function having the general form:

$T = K_1(\Delta t / T_{avg}) + K_2(\Delta f / f_{avg}) + K_3(\Delta m / M_{avg})$ where $K_1$, $K_2$ and $K_3$ constants. The value for a given T, F, and M in excess of a predetermined value indicate that the cow identified in connection with the given T, F, M is in heat. If desired, adjustments to the predetermined value can be made to increase or decrease the sensitivity of the heat detection process.

Another program can be designed to enable central computer 20 to diagnose mastitis, i.e., an infectious disease of the udder, in identified cows. As was the case with a cow in heat, a cow having mastitis exhibits decreased feed consumption and reduced milk production. The temperature rise characteristic of mastitis, however, occurs only in the infected quadrant of the udder. Consequently, it is necessary to provide the milking apparatus 36 of FIG. 1 with conventional individual milking cups (not shown) and temperature sensors for each quadrant. Various udder temperatures, the feed consumption, and the milk production are monitored in a fashion similar to that employed to detect a cow in heat, and appropriate calculations are performed to compare the temperature in each utter $T_{u1}$-$T_{u4}$ with the average udder temperature $T_{uavg}$, where:

$$T_{uavg} = \frac{t_{u1} + t_{u2} + t_{u3} + t_{u4}}{4}$$

If of the udder temperatures exceeds the average udder temperature by a predetermined amount, i.e., where either:

$t_{u1} - t_{uavg} > K_1$ or
$t_{u2} - t_{uavg} > K_2$ or
$t_{us} - t_{uavg} > K_3$ or
$t_{u4} - t_{uavg} > K_4$, and the current feed consumption $f_c$ is less than the average feed consumption $f_{avg}$, i.e., where $f_{avg} - f_c < K_5;$ and the current milk production $P_c$ is less than the average milk production $P_{avg}$ by a predetermined amount i.e., where:

$P_{avg} - P_c < K_6$; mastitis is indicated. The infected quadrant of the identified cow's udder is ascertained by noting which of the four udder temperatures $t_{u1}$-$t_{u4}$ exceeds the average udder temperature $t_{uavg}$ by the predetermined amount. A suitable alarm can thereafter be generated to alert the system operator to the presence of mastitis in the identified cow.

Additionally, the somatic cell count is a direct indication of mastitis. To determine this count, the sensors 52 will include a conductivity sensor to determine the electrical conductivity of the milk. The cell count is directly proportional to the conductivity of the milk, and this information may be sent along lead 56 and registered in the computer 20.

Finally, the sensors 52 may include photo optical sensors or other known sensors to measure the milk density. This milk density information provided to the computer on the lead 56 is a direct indication of the butterfat content of the milk.

INDUSTRIAL APPLICABILITY

The animal feeding and monitoring system of the present invention can be utilized to tag and identify individual members of a group or herd of animals in order to carry out certain control and monitoring functions with regard to the identified animals. Carefully measured quantities of feed, for instance, can be delivered to an identified animal in accordance with the particular feeding requirements of that animal. Heat cycles in identified animals can be detected, and the system operator can be alerted to the fact that an identified animal is in heat. Where the identified animals are cows, daily milk production associated each identified animal can be recorded. It is further possible to diagnose mastitis in an identified cow by measuring selected variables related to the identified cow's temperature, feed consumption and milk production. It is thus evident that the system provides a means for increasing operating efficiencies in the field of animal husbandry. With appropriate modification, it is also possible to use the electronic identity tag of the present invention to identify various types of inanimate objects. It is to be understood that such modifications, as carried out by persons skilled in the art, fall within the scope and spirit of the present invention. Indeed, it is the intention of the inventor to be limited only by the following claims.

I claim:

1. A system for feeding and monitoring a plurality of animals in a plurality of adjacent stalls comprising a plurality of electronic identity means for respectively identifying said plurality of animals, each of said plurality of electronic identity means including a power supply means for supplying operating power and a code generator means connected to receive operating power from said power supply means for generating a coded identifier signal uniquely associated with each said electronic identity means, a plurality of receivers respectively mounted in said plurality of adjacent stalls, each said receiver including a receiving circuit means for detecting said coded identifier signal whenever one of the animals carrying one of said electronic identity means enters the stall within which said receiver is mounted, each said receiving circuit means having a means for decoding said coded identifier signal to produce a decoded identifier signal, a central control means connected to said plurality of receivers for receiving said decoded identifier signals therefrom and a multiplexer means connected between said central control means and said plurality of receivers for insuring that only one of said receivers is active at a time.

2. The system for feeding and monitoring a plurality of animals as set forth in claim 1, wherein said power supply means in each of said electronic identity means includes pick-up coil means for receiving electromagnetic energy and a purality of electromagnetic field generator means for generating electromagnetic energy to be received by said pick-up means in response to control signals supplied by said control means, said electromagnetic field generator means being mounted in said plurality of adjacent stalls and connected through said multiplexer means to said central control means such that control signals from said central control means are supplied to only one of said electromagnetic field generator means at a time.

* * * * *

UNITED STATES PATENT AND TRADEMARK OFFICE
CERTIFICATE OF CORRECTION

PATENT NO. : 4,532,892
DATED : August 6, 1985
INVENTOR(S) : James H. Kuzara

It is certified that error appears in the above-identified patent and that said Letters Patent is hereby corrected as shown below:

Column 6, line 31 : "analgous" should be -- analogous --;

Column 6, line 34 : "is rectifier" should be -- is rectified --;

Column 7, line 64 : "recitifier 62 recitifies" should be -- rectifier 62 rectifies --;

Column 8, line 2 : "empolyed" should be -- employed --;

Column 8, line 42 : "AND gate 72" should be -- AND gate 70 --;

Column 10, line 62: "$P_c-P_p>B,$" should be -- $P_c-P_p<B,$ --;

Column 11, line 60: "$T=K_1(\Delta t/T_{avg})+K_2(\Delta f/f_{avg})+K_3(\Delta m/M_{avg})$" should be
-- $T=K_1(\Delta t/T_{avg})+K_2(\Delta f/F_{avg})+K_3(\Delta m/M_{avg})$ --

Column 11, line 61: After "$K_3$" insert -- are --;

Column 12, line 19: After "If" insert -- any --;

Column 12, line 25: "$t_{us}-t_{uavg}>K_3$ or" should be -- $t_{u3}-t_{uavg}>K_3$ or --.

Signed and Sealed this

Eighteenth Day of February 1986

[SEAL]

Attest:

DONALD J. QUIGG

Attesting Officer

Commissioner of Patents and Trademarks